(12) United States Patent  
Slots et al.

(10) Patent No.: US 8,171,619 B2  
(45) Date of Patent: May 8, 2012

(54) DEVICE FOR MANUFACTURING A PRE-ASSEMBLY FOR A TIRE

(75) Inventors: Antonie Slots, Heeten (NL); Gerrit Mulder, Oene (NL)

(73) Assignee: VMI Holland B.V., RK Epe (NL)

( * ) Notice: Subject to any disclaimer, the term of this patent is extended or adjusted under 35 U.S.C. 154(b) by 495 days.

(21) Appl. No.: 12/468,906

(22) Filed: May 20, 2009

(65) Prior Publication Data

US 2009/0293267 A1    Dec. 3, 2009

Related U.S. Application Data

(60) Provisional application No. 61/130,663, filed on Jun. 2, 2008.

(51) Int. Cl.
*B23P 19/00* (2006.01)
*B60C 9/00* (2006.01)

(52) U.S. Cl. ...... 29/819; 29/407.05; 29/802; 156/394.1; 156/406.4; 156/406.6

(58) Field of Classification Search ............... 29/407.05, 29/802, 819, 820; 156/111, 123, 394.1, 406.4, 156/406.6
See application file for complete search history.

(56) References Cited

U.S. PATENT DOCUMENTS

| 3,728,181 | A | * | 4/1973 | Simmons | 156/96 |
| 4,875,959 | A | * | 10/1989 | Kumagai | 156/123 |
| 5,135,601 | A | * | 8/1992 | Klose et al. | 156/406.4 |
| 5,206,720 | A | * | 4/1993 | Clothiaux et al. | 348/95 |
| 5,213,651 | A | * | 5/1993 | Fukamachi et al. | 156/406.2 |
| 5,762,740 | A | * | 6/1998 | Benzing et al. | 156/133 |
| 6,126,780 | A | * | 10/2000 | Benzing et al. | 156/406.4 |
| 6,280,548 | B1 | * | 8/2001 | Benzing et al. | 156/133 |
| 6,461,459 | B1 | * | 10/2002 | Ogawa et al. | 156/117 |
| 6,632,308 | B1 | * | 10/2003 | Yovichin | 156/123 |
| 2006/0137804 | A1 | * | 6/2006 | Downing et al. | 156/123 |
| 2007/0113948 | A1 | * | 5/2007 | Shimizu et al. | 156/64 |
| 2008/0149258 | A1 | * | 6/2008 | Downing et al. | 156/117 |

* cited by examiner

*Primary Examiner* — Jermie Cozart (74) *Attorney, Agent, or Firm* — Ladas & Parry LLP (57) ABSTRACT

Device for manufacturing a cut-to-length pre-assembly for a tire, wherein in the pre-assembly first and second side walls are situated on either side of an inner liner. The device comprises a supply conveyor for conveying the cut pre-assembly to the building drum. The device is provided with a first side wall measuring device for measuring the length of the first side wall of the cut pre-assembly and for giving a first side wall measuring signal indicative of the measured length of the first side wall, with a second side wall measuring device for measuring the length of the second side wall of the cut pre-assembly and for giving a second side wall measuring signal indicative of the measured length of the second side wall, and with an inner liner measuring device for measuring the length of the inner liner of the cut pre-assembly and for giving an inner liner measuring signal indicative of the measured length of the inner liner.

10 Claims, 6 Drawing Sheets

DEVICE FOR MANUFACTURING A PRE-ASSEMBLY FOR A TIRE

This application claims the benefit of U.S. Provisional Application No. 61/130,663 filed Jun. 2, 2008 and incorporates the same by reference.

BACKGROUND OF THE INVENTION

The invention relates to a device for manufacturing a pre-assembly for a tyre, which device is provided with a building drum for receiving the pre-assembly, with an inner liner stock roll for containing an inner liner, with a first side wall stock roll for containing a first side wall and a second side wall stock roll for containing a second side wall, with a joining device for joining the inner liner and the side walls together into a pre-assembly, wherein in the pre-assembly the first and second side walls are situated on either side of the inner liner, which joining device is provided with a cutting device for cutting the pre-assembly to length and with a supply conveyor for conveying the cut pre-assembly to the building drum.

Such a device for manufacturing a pre-assembly for a tyre is among others known from EP-A2-0 744 278. In said device the pre-assembly is cut to a length corresponding with the circumference of the building drum, wherein it is desirable that the leading end of the cut pre-assembly and the trailing end of the cut pre-assembly come to abut each other fittingly without a gap or overlap in order for a proper splice to be formed between them. As the inner liner and the side walls are made of different materials, and due to winding the materials onto the stock rolls different tensions are present in the materials, differences in length often occur after cutting the material. As a result it often happens that the leading and the trailing end lie at different distances from each other on the building drum. An operator then ensures manually that the leading and trailing end come to abut each other correctly. Not only does said manual correction take time, it cannot always take place reproducibly either.

SUMMARY OF THE INVENTION

It is an object of the present invention to provide a device for manufacturing a pre-assembly for a tyre with which the manual correction is no longer necessary, which results in the time needed for manufacturing a tyre being shortened, and as a result of which tyres can be manufactured in a more reproducible manner. For that purpose according to the invention a device of the type mentioned in the preamble is further characterised in that the device is provided with a first side wall measuring device for measuring the length of the first side wall of the cut pre-assembly and for giving a first side wall measuring signal indicative of the measured length of the first side wall, with a second side wall measuring device for measuring the length of the second side wall of the cut pre-assembly and for giving a second side wall measuring signal indicative of the measured length of the second side wall, and with an inner liner measuring device for measuring the length of the inner liner of the cut pre-assembly and for giving an inner liner measuring signal indicative of the measured length of the inner liner. Because the device for manufacturing a pre-assembly for a tyre is provided with a first and second side wall measuring device and an inner liner measuring device the differences in length between the side walls and the inner liner can be measured, as a result of which the correction of the differences in length can take place more accurately and reproducibly.

In one embodiment of a device according to the invention the device is furthermore provided with a pressure roll for pressing the cut pre-assembly against the building drum, wherein the pressure roll is provided with a non-rotatable shaft extending in a longitudinal direction of the pressure roll, a plurality of uniformly spaced apart radial discs on the shaft, wherein each disc comprises an internal part that is individually slidably supported on the shaft for radial movement with respect to the building drum, and an external ring surrounding the internal part and rotatably supported on the internal part, wherein the internal part has a recess the length of which exceeds the corresponding size of the shaft, wherein the recess has side walls that slidably engage onto the side walls of the shaft for movement in a radial direction with respect to the building drum, wherein the shaft comprises a plurality of radial bores, one for each disc, a piston arranged in the internal part of each disc, which piston slidably engages into a respective radial bore of the shaft, wherein the shaft has ducts that are connected to respective bores for supplying a pressure medium thereto from a pressure supplying device so that each disc is radially movable on the shaft while operating the respective piston in the respective bore in the shaft, wherein the plurality of discs comprises a first side wall disc group for pressing the first side wall against the building drum, a second side wall disc group for pressing the second side wall against the building drum, and an inner liner disc group for pressing the inner liner against the building drum. Such a pressure roll is known per se from U.S. Pat. No. 6,105,648. The use of said pressure roll makes it possible to carry out the correction of the differences in length automatically, that means without manual intervention. Particularly when the pressure supplying device contains a control device for depending on the first side wall measuring signal, the second side wall measuring signal and/or the inner liner measuring signal applying a pressure in question onto the disc group in question, a quick, reproducible automatic correction is possible. After extensive research it has namely turned out that a difference in length after cutting can be corrected by applying a pressure difference onto the cut pre-assembly when it is wound onto the building drum. When for instance one of the side walls is shorter than the inner liner, a larger pressure exerted by the pressure roll onto said side wall while the latter is being wound onto the building drum ensures that said side wall is extended. By comparison by experiment the pressure difference necessary for a certain length correction can easily be determined per material. The pressure roll may alternatively be designed such that the bores of the discs belonging to one group have been combined into one common chamber.

An extremely accurate winding of a pre-assembly, having a leading end and a trailing end, onto a building drum is achieved in one embodiment of a device according to the invention wherein the device is provided with a first retaining device for retaining the leading end on the building drum during winding the pre-assembly onto the building drum. An optimal accuracy can be achieved when the device is also provided with a second retaining device for retaining the trailing end on the supply conveyor during winding the pre-assembly onto the building drum. In this way the leading and trailing ends of the pre-assembly are at all times retained in a fixed position when being wound onto the building drum, as a result of which the winding of the pre-assembly onto the building drum takes place highly accurately, so that manual correction of differences in length will hardly ever or may even never be necessary any more. This aspect of retaining the leading and trailing ends may also be applied independently of the use of the measuring device, and forms an individual aspect of the invention.

In one embodiment of a device according to the invention the first retaining device comprises an elongated clamping element, which clamping element at the extreme ends is provided with magnets and between the extreme ends comprises a surface of flexible material, which clamping element due to a clamping element holder can be placed on the building drum during rotation of the building drum, and due to the magnets is detachably arranged on the building drum, wherein the clamping element holder is also adapted for during rotation of the building drum removing the clamping element from the building drum. It will be clear that in an alternative embodiment the building drum is provided with magnets for detachably holding the clamping element.

Alternatively the first retaining device may be a vacuum device integrated in the building drum.

In actual practice it has turned out that the tensions in the material make the material slightly change shape immediately after cutting the material. In order to ensure that this change of shape occurs to a lesser extent or even not at all, in one embodiment of a device according to the invention the device is provided with a vacuum device which is situated underneath at least the part of the supply conveyor situated underneath the cutting device and in conveyance direction up to some distance therefrom, wherein the vacuum device is suitable for retaining the pre-assembly on the supply conveyor. It has turned out to be advantageous to provide the supply conveyor with through-holes for the vacuum generated by the vacuum device to retain the material against the supply conveyor. This and optionally other vacuum devices advantageously extend over the full width and length of the supply conveyor.

In order to ensure that during conveying the material does not change shape or as little as possible, particularly to prevent shrinking of the material, in one embodiment of a device according to the invention the surface of the supply conveyor is made of material that adheres to the material of the pre-assembly.

It is advantageous when the supply conveyor comprises a first conveyor which is placed underneath the cutting device, and a second conveyor which is placed between the first conveyor and the building drum. As a result the winding of the cut pre-assembly onto the building drum can take place independent of supplying and cutting the pre-assembly, and it is even possible that the building drum remains rotating continuously.

BRIEF DESCRIPTION OF THE DRAWINGS

The invention will be elucidated on the basis of a number of exemplary embodiments shown in the attached drawings, in which.

DETAILED DESCRIPTION OF THE DRAWINGS

Figure 1:
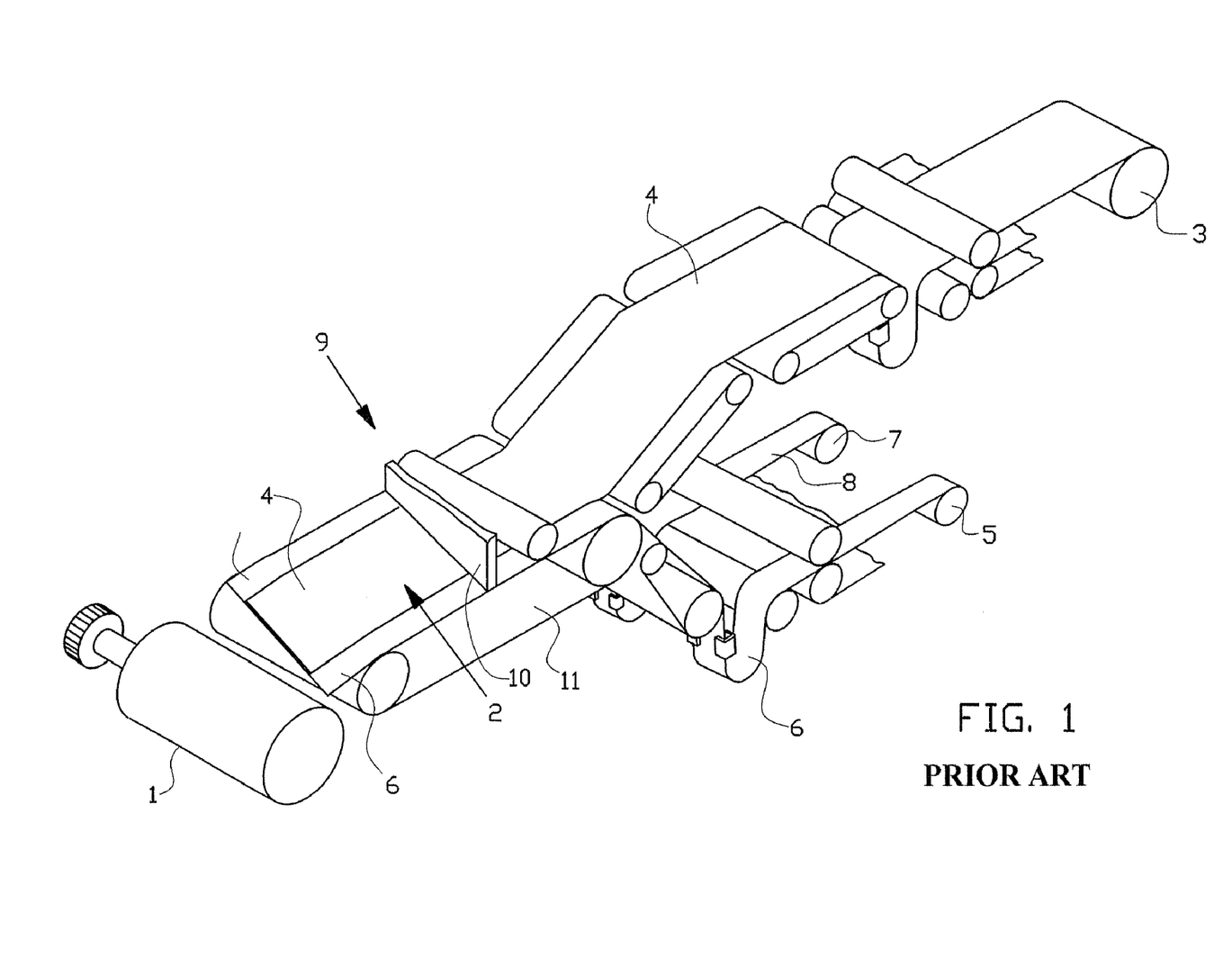
FIG. 1 shows a schematic view in perspective of a known device for manufacturing a pre-assembly for a tyre.

FIG. 1 shows a schematic view in perspective of a device known from EP-A2-0 744 278 for manufacturing a pre-assembly for a tyre. The device is provided with a building drum 1 for receiving the pre-assembly 2. The device further comprises an inner liner stock roll 3 for containing an inner liner 4. The device further comprises a first side wall stock roll 5 for containing a first side wall 6 and a second side wall stock roll 7 for containing a second side wall 8.

The known device further comprises a joining device 9 for joining the inner liner 4 and the side walls 6, 8 together into a pre-assembly, wherein in the pre-assembly 2 the first and second side walls 6, 8 are situated on either side of the inner liner 4. The joining device 9 is provided with a cutting device 10, for instance an ultrasonic cutting device or a cutting device with a rotating blade, for cutting the pre-assembly 2 to length and with a supply conveyor 11 for conveying the cut pre-assembly 2 to the building drum 1.

Figure 2:
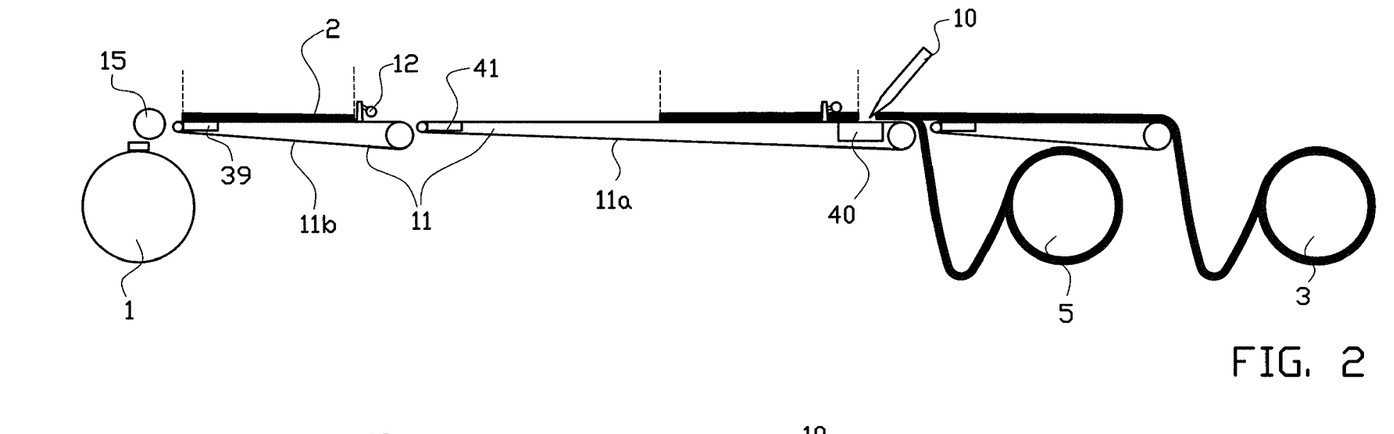
FIG. 2 shows a schematic side view of an inventive device for manufacturing a pre-assembly for a tyre.
Figure 3:
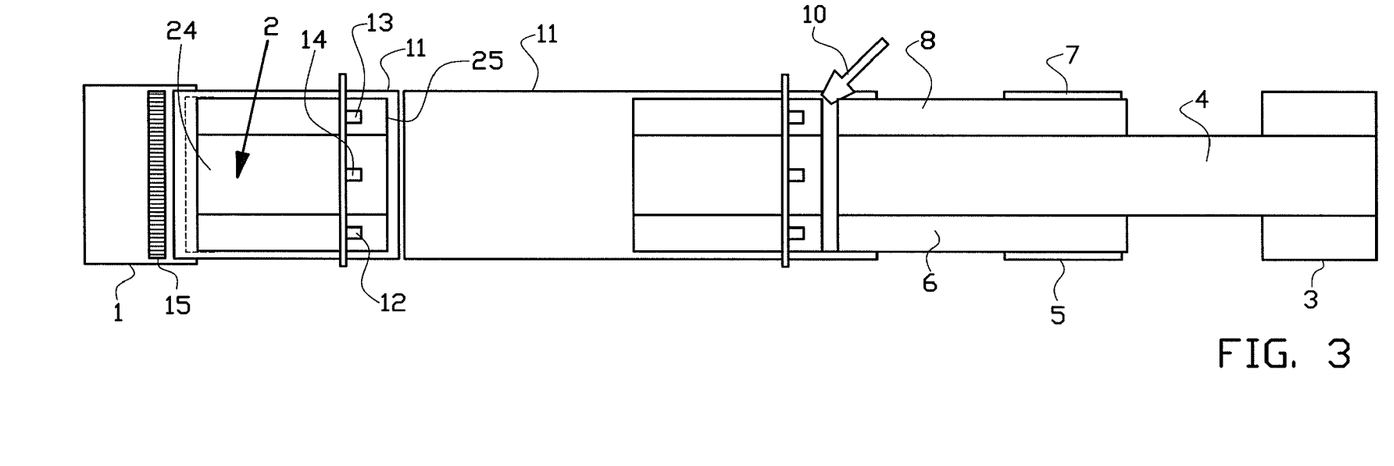
FIG. 3 shows a top view of the device shown in FIG. 2.

In FIG. 2 a schematic side view and in FIG. 3 a schematic top view is shown of an inventive device for manufacturing a pre-assembly for a tyre. The inventive device is provided with a first side wall measuring device 12 for measuring the length of the first cut side wall 6 of the cut pre-assembly 2 and for giving a first side wall measuring signal indicative of the measured length of the first side wall 6, with a second side wall measuring device 13 for measuring the length of the second cut side wall 8 of the cut pre-assembly 2 and for giving a second side wall measuring signal indicative of the measured length of the second side wall 8, and with an inner liner measuring device 14 for measuring the length of the cut inner liner 4 of the cut pre-assembly 2 and for giving an inner liner measuring signal indicative of the measured length of the inner liner 4.

Figure 8:
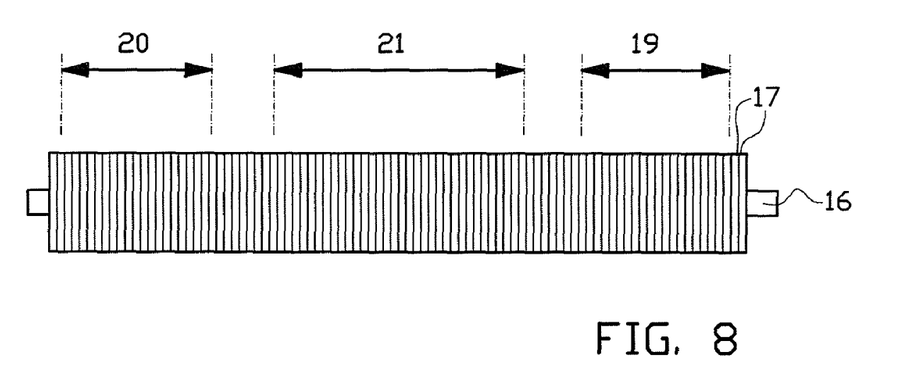
FIG. 8 shows in schematic front view the pressure roll to be used in the device according to FIG. 2.

The inventive device is furthermore provided with a pressure roll 15 (also see FIGS. 8 and 9) for pressing the cut pre-assembly 2 against the building drum 1. The pressure roll 15 is of the type as for instance described in U.S. Pat. No. 6,105,648, and is provided with a non-rotatable shaft 16, extending in a longitudinal direction of the pressure roll 15. The pressure roll 15 further comprises a plurality of uniformly spaced apart radial disks 17 on the shaft 16, wherein each disk 17 comprises an internal part that is individually slidably supported on the shaft 16 for radial movement with respect to the building drum 1. An external ring surrounding the internal part, is rotatably supported on the internal part, wherein the internal part has a recess the length of which exceeds the corresponding size of the shaft 16, wherein the recess has side walls that slidably engage onto the side walls of the shaft 16 for movement in a radial direction with respect to the building drum 1. The shaft 16 comprises a plurality of radial bores, one for each disc 17, a piston arranged in the internal part of each disc 17, which piston slidably engages into a respective radial bore of the shaft 16, wherein the shaft has ducts 18 that are connected to respective bores for supplying a pressure medium thereto from a pressure supplying device 22, so that each disc 17 is radially movable on the shaft 16 while operating the respective piston in the respective bore in the shaft 16. In that case the plurality of discs 17 comprises a first side wall disc group 19 for pressing the first side wall 6 against the building drum 1, a second side wall disc group 20 for pressing the second side wall 8 against the building drum 1, and an inner liner disc group 21 for pressing the inner liner 4 against the building drum 1.

Figure 9:
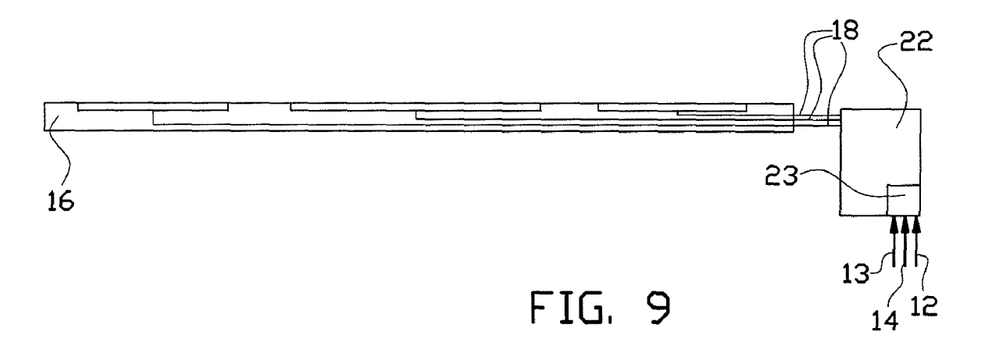
FIG. 9 schematically shows the shaft of the pressure roll shown in FIG. 8 with the different zones.

The pressure supplying device 22 comprises a control device 23 for depending on the first side wall measuring signal (coming from the measuring device 12), the second side wall measuring signal (coming from the measuring device 13) and/or the inner liner measuring signal (coming from the measuring device 14) applying a quantity of pressure medium onto the disc group 19, 20, 21 in question. In that case the disc groups can be operated per group by a duct belonging to a group, as schematically shown in FIG. 9. In that case the bores of the discs belonging to one group as shown can be joined into a common chamber.

Figure 4:
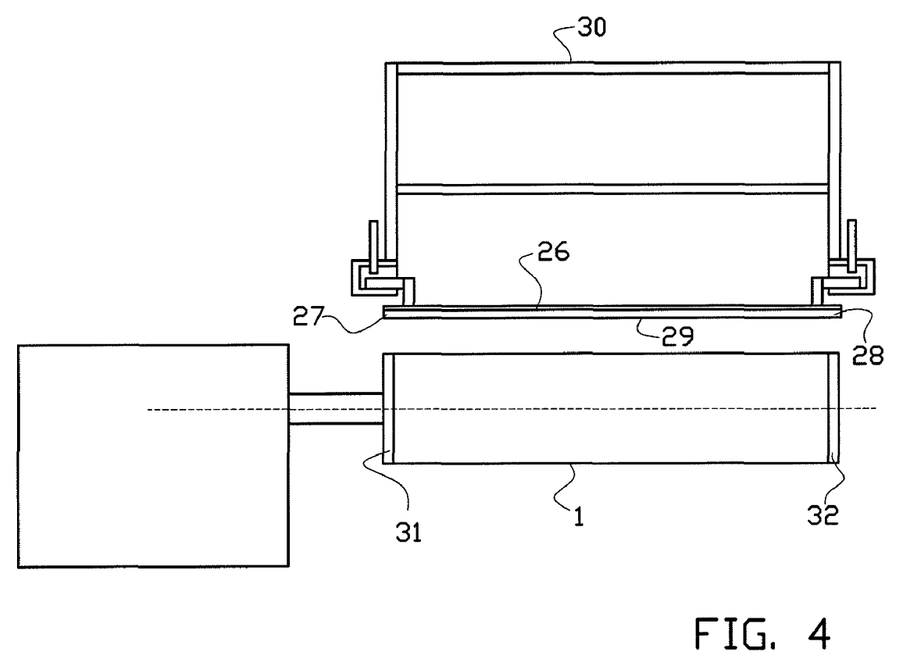
FIG. 4 shows a schematic front view of an embodiment of a retaining device with clamping element holder and clamping element to be used in the inventive device.

In FIG. 4 a schematic front view is shown of an embodiment of a retaining device having a clamping element holder and clamping element to be used in the inventive device, wherein FIGS. 5A-5E show schematic side views of some positions of the clamping element according to FIG. 4 on the building drum during rotation of the building drum 1. As shown in FIG. 3 the pre-assembly 2 has a leading end 24 (FIG. 3) and a trailing end 25. The inventive device is provided with a first retaining device for during winding the pre-assembly 2 onto the building drum 1 retaining the leading end 24 on the building drum 1. In the embodiment shown in FIGS. 4 and 5 the first retaining device comprises an elongated clamping element 26, which clamping element 26 at the extreme ends 27, 28 is provided with magnets for magnetic attachment to parts 31, 32 in question of the building drum 1, and between the extreme ends comprises a surface 29 of flexible material. Due to a clamping element holder 30 the clamping element 26 can be placed on the building drum 1 during rotation of the building drum and due to the magnets is detachably arranged on the building drum 1. The clamping element holder 30 is also adapted for during rotation of the building drum removing the clamping element 26 from the building drum 1. It will be clear that in an alternative embodiment the building drum is provided with magnets for detachably holding the clamping element.

Figures 5A, 5B:
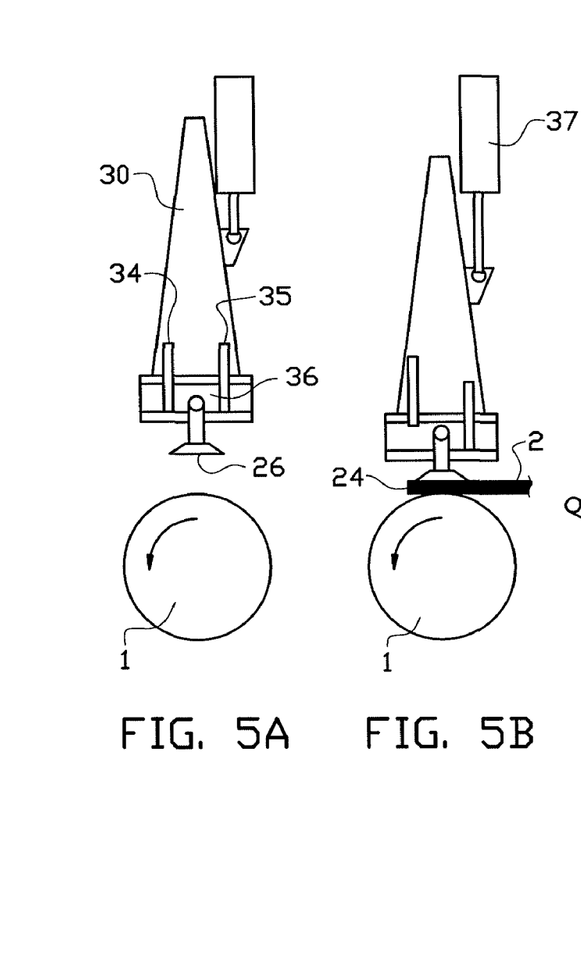
FIGS. 5A-5E show in schematic side view some positions of the clamping element according to FIG. 4 on the building drum during rotation of the building drum.
Figure 5C:
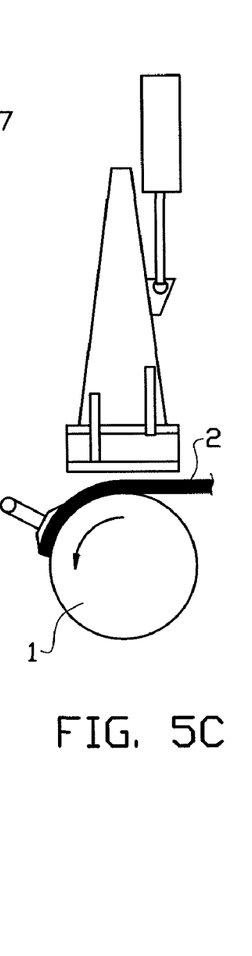
Figure 5D:
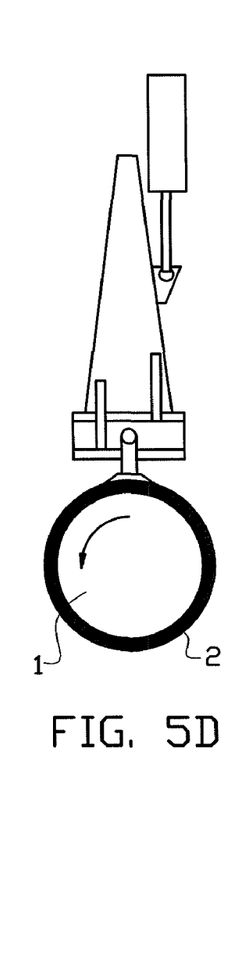
Figure 5E:
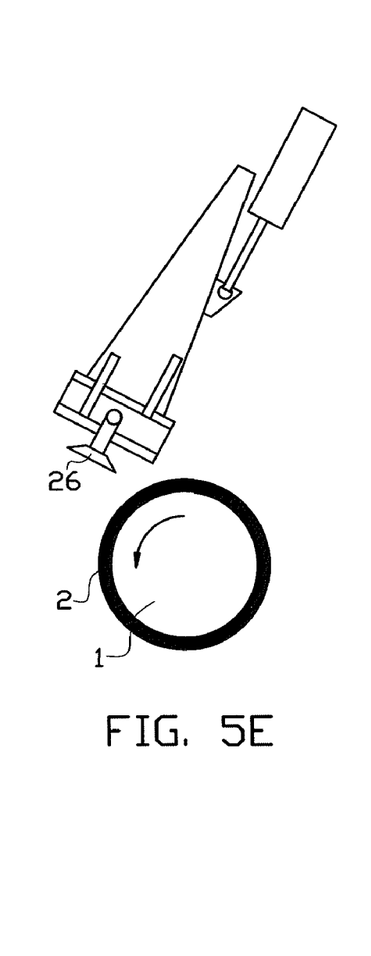

In FIG. 5A the starting position is shown in which the clamping element 26 is held on the clamping element holder 30, and is confined between slidable stops 34, 36, closing off a slit 36 in which the clamping element 26 is slidably accommodated. After the leading end 24 of the pre-assembly 2 has been placed on the building drum 1, the clamping element 26 is moved towards the leading end 24 by means of a cylinder 37 until the clamping element 26 is clamped onto the building drum 1 by magnetic forces. The stop 34 is moved upwards (FIG. 5B) and at further rotation the clamping element 26 is taken along by the building drum 1 (FIG. 5C), wherein the leading end 24 remains correctly positioned. The stop 34 is moved downwards again and the stop 35 is moved upwards so that after a full rotation of the building drum 1 (FIG. 5D) the clamping element 26 is accommodated in the clamping element holder 30 again. The clamping element holder is swung in rotation direction of the building drum 1 (FIG. 5E) so that the clamping element 26 with relatively little force, and without adverse influence on the pre-assembly 2 wound on the building drum 1, is removed from the building drum 1. After that the clamping element holder 30 can be brought into the starting position again. It will be clear that within the scope of the invention other retaining devices can be used as well.

For instance the first retaining device may also be a vacuum device integrated in the building drum 1 for pulling the leading end against the building drum by means of a vacuum.

Figure 6:
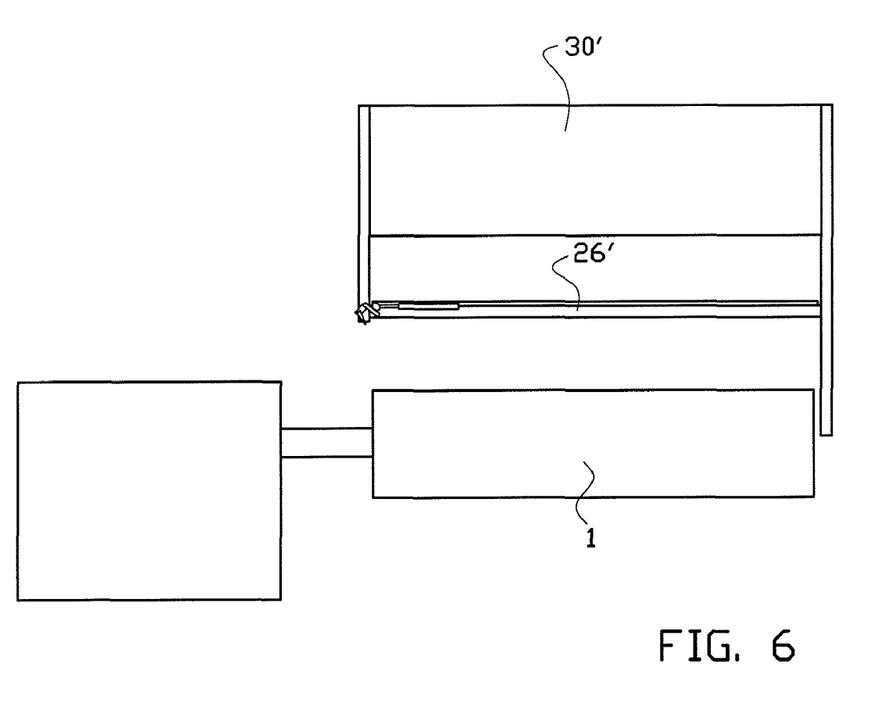
FIG. 6 shows a schematic front view of another embodiment of a retaining device with clamping element holder and clamping element to be used in the inventive device.
Figure 7A:
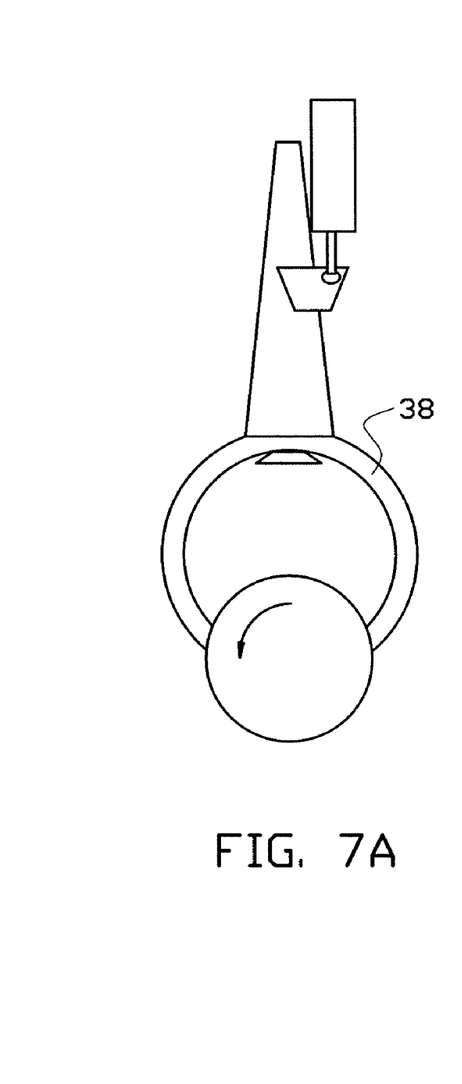
FIG. 7A-7D show in schematic side view some positions of the clamping element according to FIG. 6 on the building drum during rotation of the building drum.
Figure 7B:
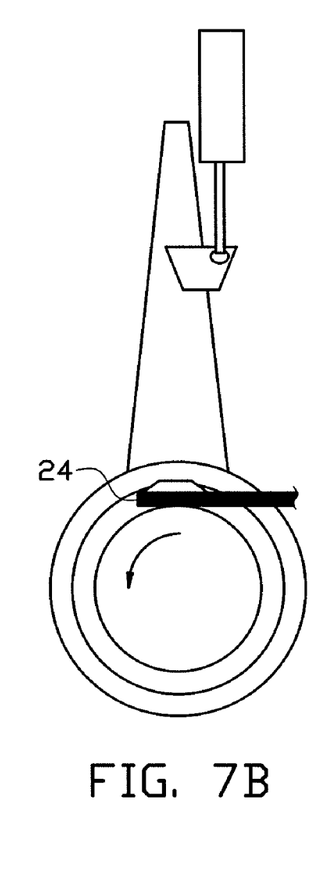
Figure 7C:
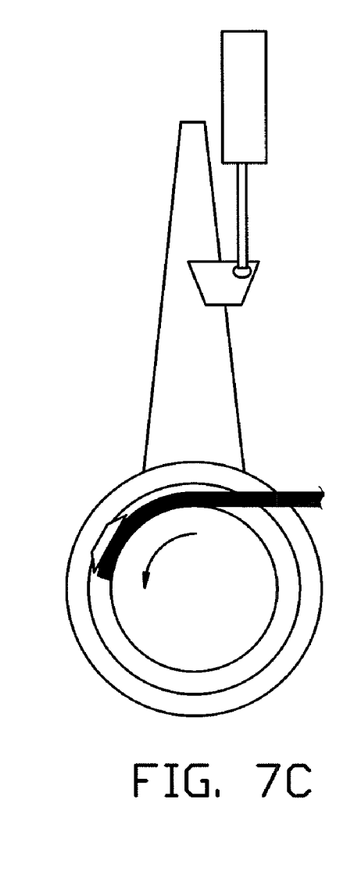
Figure 7D:
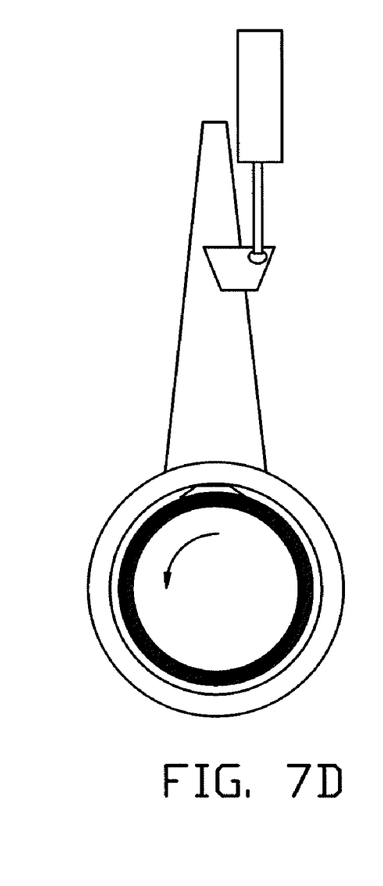

Another alternative for the first retaining device is shown in FIGS. 6 and 7. In that case the clamping element 26' is rotatably attached to a part 38 of the clamping element holder 30'. All this is designed such (see FIGS. 7A-7D) so as to have the clamping element 26' rotate synchronously with the building drum 1 when the pre-assembly is wound onto the building drum 1, wherein the clamping element 26' retains the leading end 24 on the building drum 1.

As shown in FIG. 2 the device is also provided with a second retaining device 39 for during winding the pre-assembly 2 onto the building drum 1 retaining (at least) the trailing end 25 on the supply conveyor 11. The second retaining device 39 in the embodiment shown is a vacuum device which via through-holes in the supply conveyor pulls at least the trailing end of the pre-assembly against the surface of the supply conveyor.

As is also shown in FIG. 2 the device is provided with a vacuum device 40 which is situated underneath at least a part of the supply conveyor 11 that is situated underneath the cutting device 10 and in conveyance direction up to some distance therefrom, wherein the vacuum device 40 is suitable for retaining the pre-assembly on the supply conveyor 11. As a result during and after cutting the pre-assembly is retained in the correct position on the supply conveyor. In the embodiment of the device shown in FIG. 2 the supply conveyor 11 comprises a first conveyor 11a which is placed underneath the cutting device 10, and a second conveyor 11b which is placed between the first conveyor 11a and the building drum 1. Said second conveyor 11b makes it possible that the pre-assembly can be wound onto the building drum 1 independent of the supply of the inner liner and the side walls, wherein it is also possible that the building drum 1 remains rotating continuously. For correctly transferring the pre-assembly from the first conveyor 11a to the second conveyor 11b a further vacuum facility 41 may be arranged at the end of the first conveyor 11a.

The surface of the supply conveyor 11a, 11b is advantageously made of material adhering to the material of the pre-assembly so that the position of the material during conveying remains at least almost unchanged, it particularly prevents material from shrinking.

The above description is included to illustrate the operation of preferred embodiments of the invention and not to limit the scope of the invention. Starting from the above explanation many variations that fall within the spirit and scope of the present invention, particularly as defined in the attached claims, will be evident to an expert.

The invention claimed is:

1. Device for manufacturing a pre-assembly (2) for a tire, which device is provided with:
 a building drum (1) for receiving the pre-assembly (2),
 an inner liner stock roll (3) for containing an inner liner (4),
 a first side wall stock roll (5) for containing a first side wall (6) and a second side wall stock roll (7) for containing a second side wall (8),
 a joining device (9) for joining the inner liner (4) and the side walls (6, 8) together into a pre-assembly (2), wherein in the pre-assembly (2) the first and second side walls (6, 8) are situated on either side of the inner liner (4), which joining device (9) is provided with a cutting device (10) for cutting the pre-assembly (2) to length and with a supply conveyor (11; 11a, 11b) for conveying the cut pre-assembly (2) to the building drum (1), characterised in that the device is provided with a first side wall measuring device (12) for measuring the length of the first side wall (6) of the cut pre-assembly (2) and for giving a first side wall measuring signal indicative of the measured length of the first side wall, with a second side wall measuring device (13) for measuring the length of the second side wall (8) of the cut pre-assembly (2) and for giving a second side wall measuring signal indicative of the measured length of the second side wall, and with an inner liner measuring device (14) for measuring the length of the inner liner (4) of the cut pre-assembly and for giving an inner liner measuring signal indicative of the measured length of the inner liner.

2. Device according to claim 1, characterised in that the device is furthermore provided with a pressure roll (15) for pressing the cut pre-assembly (2) against the building drum (1), wherein the pressure roll (15) is provided with a non-rotatable shaft (16) extending in a longitudinal direction of the pressure roll (15), a plurality of uniformly spaced apart radial discs (17) on the shaft (16), wherein each disc comprises an internal part that is individually slidably supported on the shaft (16) for radial movement with respect to the building drum (1), and an external ring surrounding the internal part and rotatably supported on the internal part, wherein the internal part has a recess the length of which exceeds the corresponding size of the shaft (16), wherein the recess has side walls that slidably engage onto the side walls of the shaft (16) for movement in a radial direction with respect to the building drum (1), wherein the shaft (16) comprises a plurality of radial bores, one for each disc (17), a piston arranged in the internal part of each disc (17), which piston slidably engages into a respective radial bore of the shaft (16), wherein the shaft (16) has ducts (18) that are connected to respective bores for supplying a pressure medium thereto from a pressure supplying device (22) so that each disc (17) is radially movable on the shaft (16) while operating the respective piston in the respective bore in the shaft (16), wherein the plurality of discs (17) comprises a first side wall disc group (19) for pressing the first side wall (6) against the building drum (1), a second side wall disc group (20) for pressing the second side wall (8) against the building drum (1), and an inner liner disc group (21) for pressing the inner liner (4) against the building drum (1).

3. Device according to claim 2, characterized in that the pressure supplying device (22) contains a control device (23) for depending on the first side wall measuring signal, the second side wall measuring signal and/or the inner liner measuring signal applying a pressure in question onto the disc group (19, 20, 21) in question.

4. Device according to claim 1, characterised in that the pre-assembly (2) has a leading end (24) and a trailing end (25), wherein the device is provided with a first retaining device for retaining the leading end (24) on the building drum (1) during winding the pre-assembly (2) onto the building drum (1).

5. Device according to claim 4, characterised in that the first retaining device comprises an elongated clamping element (26; 26'), which clamping element (26; 26') at the extreme ends (27, 28) is provided with magnets and between the extreme ends (27, 28) comprises a surface (29) of flexible material, which clamping element (26; 26') due to a clamping element holder (30, 30') during rotation of the building drum can be placed on the building drum (1), and due to the magnets is detachably arranged on the building drum (1), wherein the clamping element holder (30; 30') is also adapted for during rotation of the building drum removing the clamping element (26; 26') from the building drum (1).

6. Device according to claim 4, characterised in that the first retaining device is a vacuum device integrated in the building drum (1).

7. Device according to claim 1, characterised in that the pre-assembly (2) has a leading end (24) and a trailing end (25), wherein the device is provided with a second retaining device (39) for retaining the trailing end (25) on the supply conveyor (11; 11a, 11b) during winding the pre-assembly (2) onto the building drum (1).

8. Device according to claim 1, characterised in that the device is provided with a vacuum device (40) which is situated underneath at least the part of the supply conveyor (11; 11b) situated underneath the cutting device (10) and in conveyance direction up to some distance therefrom, wherein the vacuum device (40) is suitable for retaining the pre-assembly (2) on the supply conveyor (11; 11b).

9. Device according to claim 1, characterised in that the surface of the supply conveyor (11; 11a, 11b) is made of material that adheres to the material of the pre-assembly (2).

10. Device according to claim 1, characterised in that the supply conveyor comprises a first conveyor (11a) which is placed underneath the cutting device (10), and a second conveyor (11b) which is placed between the first conveyor (11a) and the building drum (1).

* * * * *